US000001402H

United States Statutory Invention Registration [19]

[11] Reg. Number: H1402

Chin et al.

[43] Published: Jan. 3, 1995

[54] STYRENE-ISOPRENE-STYRENE BLOCK COPOLYMER COMPOSITION AND ADHESIVES MADE THEREFROM

[75] Inventors: Steven S. Chin, Houston, Tex.; John A. Miller, Woodbury; Ramsis Gobran, Roseville, both of Minn.

[73] Assignee: Shell Oil Company, Houston, Tex.

[21] Appl. No.: 950,617

[22] Filed: Sep. 24, 1992

[51] Int. Cl.[6] ..... C08L 91/00

[52] U.S. Cl. ..... 525/314

[58] Field of Search ..... 525/314, 313; 524/271

[56] References Cited

U.S. PATENT DOCUMENTS

| | | | |
|---|---|---|---|
| 3,519,585 | 7/1970 | Miller | 524/271 |
| 3,681,190 | 8/1972 | Dahlquist | 428/356 |
| 3,783,072 | 1/1974 | Korpman | 156/244.23 |
| 3,784,587 | 1/1974 | Chambers | 525/314 |
| 3,787,531 | 1/1974 | Dahlquist et al. | 428/355 |
| 3,932,328 | 1/1976 | Korpman | 524/271 |
| 3,984,509 | 10/1976 | Hall et al. | 264/40.1 |
| 4,028,292 | 6/1977 | Korpman | 524/203 |
| 4,080,348 | 3/1978 | Korpman | 524/505 |
| 4,096,203 | 6/1978 | St. Clair | 524/505 |
| 4,136,071 | 1/1979 | Korpman | 524/534 |
| 4,622,357 | 11/1986 | Tsuchida et al. | 524/270 |
| 4,734,447 | 3/1988 | Hattori et al. | 524/271 |
| 4,785,043 | 11/1988 | Kawai et al. | 524/272 |
| 5,093,406 | 3/1992 | Lossner et al. | 524/483 |
| 5,118,762 | 6/1992 | Chin | 525/314 |
| 5,149,741 | 9/1992 | Alper et al. | 525/95 |

FOREIGN PATENT DOCUMENTS

| | | | |
|---|---|---|---|
| 686721 | 5/1964 | Canada | 525/314 |
| 0027606 | 4/1981 | European Pat. Off. | 525/314 |
| 2432496 | 1/1976 | Germany | 524/271 |
| 888624 | 1/1962 | United Kingdom . | |

*Primary Examiner*—Shean Wu

[57] ABSTRACT

A linear styrene-isoprene-styrene block copolymer composition comprised of linear polymeric blocks wherein the block copolymer composition has a coupling efficiency of 25 to 82 percent, a polystyrene content of from 19 to 27 percent by weight, a polystyrene block molecular weight (peak polystyrene equivalent molecular weight as determined by gel permeation chromatography) of 12,000 to 18,000, and an overall molecular weight (peak polystyrene equivalent molecular weight as determined by gel permeation chromatography) of from 170,000 to 280,000. The invention also contemplates adhesive formulations comprising these block copolymer compositions and a tackifying resin.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STYRENE-ISOPRENE-STYRENE BLOCK COPOLYMER COMPOSITION AND ADHESIVES MADE THEREFROM

BACKGROUND OF THE INVENTION

This invention relates to a novel block copolymer composition for use in adhesives. More particularly, it relates to linear styrene-isoprenestyrene block copolymer compositions comprised of linear polymeric blocks and adhesives made using such compositions.

It is known that a block copolymer can be obtained by an anionic copolymerization of a conjugated diene compound and an alkenyl arene compound by using an organic alkali metal initiator. Block copolymers have been produced which comprise primarily those having a general structure A—B and A—B—A wherein the polymer blocks A comprise thermoplastic polymer blocks of alkenyl arenes such as polystyrene, while block B is a polymer block of a conjugated diene such as polyisoprene. The proportion of the thermoplastic blocks to the elastomeric polymer block and the relative molecular weights of each of these blocks is balanced to obtain a rubber having unique performance characteristics. When the content of the alkenyl arene is small, the produced block copolymer is a so-called thermoplastic rubber. In such a rubber, the blocks A are thermodynamically incompatible with the blocks B resulting in a rubber consisting of two phases—a continuous elastomeric phase (blocks B) and a basically discontinuous hard, glass-like plastic phase (blocks A) called domains. Since the A—B—A block copolymers have two A blocks separated by a B block, domain formation results in effectively locking the B blocks and their inherent entanglements in place by the A blocks and forming a network structure.

These domains act as physical crosslinks anchoring the ends of many block copolymer chains. Such a phenomena allows the A—B—A rubber to behave like a conventional vulcanized rubber in the unvulcanized state and is applicable for various uses. For example, these network forming polymers are applicable for uses such as in adhesive formulations; as moldings of shoe soles, etc.; impact modifier for polystyrene resins and engineering thermoplastics; modification of asphalt; etc.

Different linear block copolymers exhibit different performances in adhesive formulations. Therefore, it requires some experimentation to determine the range of polymers which are useful for a particular adhesive application. For adhesive applications such as hot melt pressure sensitive adhesives, it is desirable that the polymer or the adhesive formulation containing it have the following characteristics: the viscosity of the neat polymer should range from 5,000 to 15,000 poise; the viscosity of the adhesive should be less than 20,000 poise at 43% wt. polymer content in the adhesive; the 180° peel of the adhesive formulation should be greater than 6.8 pli; the holding power to steel of the adhesive formulation should be at least 500 min., and the shear adhesion failure temperature (SAFT) to Mylar should be at least 70° C. The present invention provides polymers and adhesive formulations which will satisfy these performance requirements.

SUMMARY OF THE INVENTION

The polymers which provide the above advantages and fall within the scope of the present invention are linear styrene-isoprene-styrene block copolymers. The polymers generally have a polystyrene content of from 19 to 27% by weight, a polystyrene block molecular weight of from 12,000 to 18,000, an overall molecular weight of from 170,000 to 280,000 and a coupling efficiency of 25 to 82%. However, in addition to those four parameters, the polymer must also satisfy the five performance requirements discussed above.

In a preferred embodiment of the present invention, the polymer performance requirements are neat polymer melt viscosity of from 6000 to 15,000 poise, an adhesive melt viscosity of less than 6000 poise, a 180° peel of greater than 6.8 pli, a holding power to steel of greater than 500 min. and an SAFT to Mylar of at least 70° C. The polymers which will satisfy these criterion have a polystyrene content of from 19 to 26% by weight, a polystyrene block molecular weight of from 12,000 to 17,000, an overall molecular weight of from 170,000 to 240,000 and a coupling efficiency of from 25 to 82.

DETAILED DESCRIPTION OF THE INVENTION

As is well known, polymers containing both aromatic and ethylenic unsaturation can be prepared by copolymerizing one or more polyolefins, particularly a diolefin, in this case isoprene, with one or more alkenyl aromatic hydrocarbon monomers, in this case styrene. The copolymers may, of course, be random, tapered, block or a combination of these, in this case block. The blocks in the copolymers of this invention are linear.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as the present linear S-I-S block copolymer comprised of linear polymeric blocks are frequently prepared in solution using anionic polymerization techniques. In general, when solution anionic techniques are used, these S-I-S block copolymers are prepared by contacting the monomers to be polymerized simultaneously or sequentially with an organoalkali metal compound in a suitable solvent at a temperature within the range from about 150° C. to about 300° C., preferably at a temperature within the range from about −0° C. to 100° C. Particularly effective anionic polymerization initiators are organolithium compounds having the general formula:

$RLi_n$

Wherein:

R is an aliphatic, cycloaliphatic, aromatic or alkyl-substituted aromatic hydrocarbon radical having from 1 to about 20 carbon atoms; and n is an integer of 1 to 4.

The concentration of the initiator can be regulated to control the molecular weight of the overall composition and of the polystyrene blocks. Generally, the initiator concentration is in the range of about 0.25 to about 50 millimoles per 100 grams of monomer. The required initiator level frequently depends upon the solubility of the initiator in the hydrocarbon diluent. The ratio of the initiator to the monomer determines the block size, i.e. the higher the ratio of initiator to monomer the smaller the molecular weight of the block.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; halogenated hydrocarbons, particularly halogenated aromatic hydrocarbons, such as chlorobenzene, chlorotoluene and the like; linear and cyclic ethers such as methyl ether, methyl ethyl ether, tetrahydrofuran and the like; ketones such as methyl ketone (acetone), methyl ethyl ketone, ethyl ketone (e-pentanone) and the like.

As described in U.S. Pat. No. 4,096,203 the disclosure of which is herein incorporated by reference, usually the styrene is contacted with the initiator. Next, the living polymer in solution is contacted with isoprene. The resulting living polymer has a simplified structure A-B-Li. It is at this point that the living polymer is coupled.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Various other substituents which are inert in the treating reaction can be present such as hydrocarbon radicals as exemplified by the alkyl, cycloalkyl, aryl, aralkyl and alkaryl groups and the alkoxy, aryloxy, alkythio, arylthio, and tertiary amino groups. Many suitable types of these polyfunctional compounds have been described in U.S. Pat. Nos. 3,595,941; 3,468,972, 3,135,716; 3,078,254, and 3,594,452, the disclosures of which are herein incorporated by reference. When the coupling agent has two reactive sites such as dibromoethane, the polymer will have a linear ABA structure. When the coupling agent has three or more reactive sites, such as silicon tetrachloride, the polymer will have a branched structure, such as $(AB)_nBA$. Since the present block copolymers are linear, a coupling agent with two reactive sites must be used.

In the prior art, such as that exemplified by U.S. Pat. Nos. 3,595,941 and 3,468,972, the disclosures of which are herein incorporated by reference, the effort was always made to select the particular coupling agent or reaction conditions that resulted in the highest coupling efficiency. Lower coupling efficiencies are desired herein in order to produce adhesive compositions which adhere strongly to difficult to adhere substances such as polyolefins, e.g. polyethylene. Coupling efficiency is defined as the number of molecules of coupled polymer divided by the number of molecules of coupled polymer plus the number of molecules of uncoupled polymer. Thus, when producing an SIS linear polymer, the coupling efficiency is shown by the following relationship:

$$\frac{\#\text{ of molecules of } SIS}{\#\text{ of molecules of } SIS \text{ plus } SI}$$

Coupling efficiency can be determined theoretically from the stoichiometric quantity of coupling agent required for complete coupling or coupling efficiency can be determined by an analytical method such as gel permeation chromotography. Typical prior art coupling efficiency is from about 80% to almost 100%. In U.S. Pat. No. 4,096,203, coupling efficiency is controlled from about 20% to about 80%, preferably about 30% to about 70%. It is also within the scope of the present invention to blend polymers from processes of differing coupling efficiency. For example, if a 60% efficiency is desired, then polymers from processes having an 80% efficiency and a 40% efficiency may be blended together or a 100% triblock may be blended with a 100% diblock in a 60:40 ratio.

This coupling efficiency is controlled by an number of methods. One method to reduce coupling efficency is to add less than the stoichiometric amount of coupling agent required for complete coupling of the polymers. Another means of reducing coupling efficiency is by the premature addition of a terminator compound. These terminators, such as water or alcohol, respond very quickly and could easily be employed to cut short complete coupling of the polymers. In addition, by performing the coupling reaction at elevated temperatures, such as above about 190° F., thermal termination of many of the living polymer groups (A-B-Li) occurs prior to coupling. The typical coupling conditions include a temperature of between about 150° and about 170° F. and sufficient pressure to maintain the reactants in a liquid phase.

Following the coupling reaction or when the desired coupling efficiency has been obtained, the product is neutralized such as by the addition of terminators, e.g., hydrogen, water, alcohol or other reagents, for the purpose of removing the lithium radical forming the nucleus for the condensed polymer product. The produce is then recovered such as by coagulation utilizing hot water or steam or both.

As discussed above, in order to achieve the desired advantages in ahesive formulations one of which is to make an excellent pressure sensitive adhesive, the polymer and adhesive must have the following performance characteristics: a neat polymer melt viscosity of 5,000 to 15,000 poise, an adhesive melt viscosity of less than 20,000 poise, a 180° peel of greater than 6.8 pli, a holding power to steel of at least 500 min. and an SAFT to Mylar of at least 70° C. In order to achieve these performance requirements, the polymer must have a polystyrene content of from 19–27% by weight because at lower styrene content the polymers are too soft to manufacture and at higher than 27% styrene content the polymers are too stiff to perform as base polymers for pressure sensitive adhesives. The polymer must have polystyrene block molecular weight of 12,000 to 18,000 because at less than 12,000 the adhesives have insufficient high temperature shear and at greater than 18,000 the adhesive melt viscosity is too high. The polymer must have an overall molecular weight of from 170,000 to 280,000 because at less than 170,000 the peel adhesion valves are low and at greater than 280,000 the adhesive melt viscosity is prohibitively high. The coupling efficiency of the polymer must be in the range from 25 to 82% because at less than 25% coupling efficiency the holding power of the adhesive is too low and at greater than 82% peel adhesion is low.

The polymer characteristic ranges were determined as follows. First, it was known from past experience that in order to achieve the five performance requirements, the coupling efficiency of the polymer had to be no less than 25%, the polystyrene block molecular weight had to be greater than 11,000 and the overall molecular weight had to be at least 170,000. These limitations were necessary in order to have sufficient holding power, SAFT and peel adhesion. Then, as described in the example, a number of polymer samples were made at varying polystyrene contents, polystyrene block molecular weight, overall molecular weights and coupling efficiencies. These polymers were used to make adhesive formulations which were then tested to determine if they met the five performance requirements. This data is shown in the tables in the Example. The data from Table 2 was then analyzed using regression equations to determine the ranges shown in Table 3 and the actual polymer characteristics shown in Table 4.

In order to achieve more stringent performance requirements, i.e. a neat polymer melt viscosity of less than 600 poise, an adhesive melt viscosity of 6000 to 15,000 poise, a 180° peel of greater than 6.8 pli, a holding power to steel of greater than 500 min. and an SAFT to Mylar of at least 70° C., it is necessary to operate within the area generally defined by a polystyrene content range of 19 to 26% by weight, a polystyrene block molecular weight of from 12,000 to 17,000, an overall molecular weight range of from 170,000 to 240,000 and a coupling efficiency range of from 25 to 82%.

The molecular weights described herein are polystyrene equivalent molecular weights. Molecular weights of linear polymers or unassembled linear segments of polymers such as mono-, di-, triblock, and etc., arms of star polymers before coupling are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed.

Methods of controlling the molecular weights of the blocks and the overall polymer are quite well known. For instance, such are disclosed in U.S. Pat. Nos. 3,149,182, which states that the amount of monomer can be kept constant and different molecular weights can be achieved by changing the amount of catalyst or the amount of catalyst can be kept constant and different molecular weights can be achieved by varying the amount of the monomer, and in U.S. No. 3,231,635, the disclosures of which are herein incorporated by reference, and many others. A typical block copolymer composition within the scope of the present invention, having a coupling efficiency of 35%, polystyrene block molecular weight of 15,500, a polystyrene content of 22% and an overall molecular weight 200,000, was prepared by polymerizing styrene with sec-butyl lithium as initiator at a monomer to initiator molar ratio of 149, to 1 and then terminating the polymerization, polymerizing isoprene at a monomer to initiator molar ratio of 820 to 1 and then terminating the polymerization and finally polymerizing polystyrene again under the same conditions as before. Another typical block copolymer was made by blending a diblock polystyrene-polyisoprene polymer with a triblock polystyrene-polyisoprene-polystyrene copolymer.

It is necessary to add an adhesion promoting or tackifying resin that is compatible with the elastomeric conjugated diene block. A common tackifying resin is a diene-olefin copolymer of piperylene and 2-methyl-2butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins of the same general type may be employed in which the resinous copolymer comprises 20–80 weight percent of piperylene and 80–20 weight percent of 2-methyl-2-butene. The resins normally have softening points (ring and ball) between 80° C. and about 115° C.

Other adhesions promoting resins whcih are also useful in the compositions of this invention include hydrogenated rosins, esters of ronsins, polyterpenes, terpenephenol resins and polymerized mixed olefins. To obtain good thermo-oxidative and color stability, it is preferred that the tackifying resin be a saturated resin, e.g., a hydrogenated dicyclopentadiene resin such as Escorez ® 5000 series resin made by Exxon or a hydyrogenated polystyrene or polyalphamethylstyrene resin such as Regalrez ® resin made by Hercules.

The amount of adhesion promoting resin employed varies from about 20 to about 400 parts by weight per hundred parts rubber (phr), preferably between about 100 to about 350 phr.

The selection of the particular tackifying agent is, in large part, dependent upon the specific block copolymer employed in the respective adhesive composition. In the manufacture of disposable articles such as diapers, sanitary napkins and bed pads, there is the additional consideration of having a substantially white or clear adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 oil made by Arco. The amounts of rubber compounding oil employed in the invention composition can vary from 0 to about 100 phr, and preferably between about 0 to about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Addition stabilizers known in the art may also be incorporated into the adhesive composition. These may be for protection during the life of the disposable article against, for example, oxygen, ozone and ultraviolet radiation. However, these additional stabilizers should be compatible with the essential stabilizers mentioned herein-above and their intended function as taught herein.

The adhesive compositions of the present invention are typically prepared by blending the components at an elevated temperature, preferably between about 130° C. and about 200° C., until a homogeneous blend is obtained, usually less than three (3) hours. Various method of blending are known to the art and any method that produces a homogeneous blend is satisfactory.

The preferred use for these compositions is in pressure sensitive adhesives. However, it is useful in other applications such as diaper tab tape adhesives.

EXAMPLES

A number of polymers were prepared for use in the following experiments. These polymers and their characteristics are identified in Table 1 below.

TABLE 1

| | Polymer Identification | | |
|---|---|---|---|
| Sample ID | PSC (wt. %) | PS Block | Molecular Weight |
| A | 22.5 | 16,500 | 210,400 |
| B | 19.6 | 14,600 | 216,100 |
| C | 25.5 | 17,300 | 192,500 |
| D | 25.3 | 15,200 | 170,600 |
| E | 22.0 | 15,500 | 202,500 |
| F | 25.0 | 16,800 | 191,000 |
| G | 22.0 | 15,500 | 202,500 |

These polymers were styrene-isoprene-styrene triblock copolymers. Styrene isoprene diblock copolymers were made with the same characteristics and blended with the triblock to produce blends with varying coupling efficiencies.

The polymers were then used in an adhesive formulation and the performance of the adhesive formulation was determined. The adhesive formulation used was: 39.8% wt. polymer, 54.2% wt. Escorez 1310LC tackifying resin (a hydrocarbon resin), 5.6% wt. SHELLFLEX® 371 oil and 0.4% wt. Irganox 1010 antioxidant. The performance of the various polymers in this adhesive formulation was determined and the results are shown in Table 2 below. The melt viscosity was measured in centipoise (cps) by using a Brookfield Therocell viscometer at 350° F. The SAFT (M) Mylar was measured by 1"×1" Mylar to Mylar lap joint with a 0.23 kg weight. SAFT measures the temperature at which the lap shear assembly fails under load. The molecular weights (styrene equivalent) were determined by gel permeation chromatography as the peak molecular weight of the main species. The polystyrene content was determined by nuclear magnetic resonance spectroscopy. Holding Power (HPST) is the time required to pull a standard area (½in.×½in.) of tape from a standard steel test surface under a standard load, in shear at 2° antipeel (Pressure Sensitive Tape Council Method No. 7). Peel was determined by PSTC Test No. 1.

TABLE 2

| | | Polymer Performance REQUIREMENTS | | | | | |
|---|---|---|---|---|---|---|---|
| Sample | C.E. | MV (Polymer) (Poise) 5000–15000 | MV (Adhesive) (Poise) <20,000 | PEEL (pli) >6 | HPST (min) 50 | SAFT(M) (°C.) 65 | REQ. MET |
| A | 10 | 3717x | 3490 | 5.5x | 18x | 60x | No |
| A | 30 | 6526 | 8930 | 8.2 | 3891 | 78 | Yes |
| A | 50 | 11460 | 22860x | 10.0 | 7000+ | 86 | No |
| B | 10 | 3804x | 840 | 5.8x | 15x | 65x | No |
| B | 30 | 6397 | 2160 | 8.1 | 1259 | 82 | Yes |
| B | 50 | 10760 | 5530 | 10.1 | 7000+ | 88 | Yes |
| C | 10 | 3283x | 5990 | 5.6x | 42x | 68 | No |
| C | 30 | 5870 | 15330 | 7.7 | 7000+ | 84 | Yes |
| C | 50 | 10496 | 39240x | 8.8 | 7000+ | 89 | No |
| D | 10 | 2770x | 1310 | 5.4x | 30x | 60x | No |
| D | 30 | 4722x | 3360 | 7.6 | 4634 | 77 | No |
| D | 50 | 8051 | 8590 | 8.8 | 7000+ | 84 | Yes |
| E | 10 | 3461x | 1680 | 5.6x | 22x | 63x | No |
| E | 30 | 5942 | 4300 | 8.2 | 2718 | 82 | Yes |
| E | 50 | 10199 | 11000 | 8.5 | 5696 | 86 | Yes |
| F | 10 | 3231x | 4760 | — | — | — | No |
| F | 30 | 5712 | 10890 | — | — | — | Yes |
| G | 35 | 6801 | 5440 | 8.8 | 5905 | 84 | Yes |

x denotes failure to meet requirements

As described previously, past experience shows that in order to meet the five polymer performance characteristics, the polymer must have a coupling efficiency of at least 25, a polystyrene block molecular weight of 12,000 or greater, a polystyrene content of 19 to 27% and an overall molecular weight to greater than 170,000. Using this information and the data from Table 2, a regression analysis reveals that in order to obtain the viscosity requirements and the adhesive test requirements, the coupling efficiences for polymers of A–F must fall within the ranges shown in Table 3 below:

TABLE 3

| Sample | Summary of Polymer Parameter Limits: Viscosity Requirements MV1 (poise) 5-15M | MV2 (poise) <20000 | Adhesive Test Requirements CE >/= 25 PS > 11M Mw > 170M Overall CE Range |
|---|---|---|---|
| A | 21 </= CE </= 59 | CE < 47 | 25 </= CE < 47 |
| B | 21 </= CE </= 62 | CE < 77 | 25 </= CE < 77 |
| C | 25 </= CE </= 62 | CE < 35 | 25 </= CE < 35 |
| D | 33 </= CE </= 73 | CE < 67 | 33 </= CE < 67 |
| E | 24 </= CE </= 64 | CE < 62 | 25 </= CE < 62 |
| F | 25 </= CE </= 63 | CE < 42 | 25 </= CE < 42 |

Further work with this regression analysis yields the data shown in Table 4 below.

TABLE 4

| | PSC (wt. %) | PS Block Mw (M) | Mol. Wt. (Ms) | C.E. Range (%) |
|---|---|---|---|---|
| 1 | 19.5 | 12 | 178.6 | 35–82 |
| 2 | 19.5 | 13 | 193.5 | 30–74 |
| 3 | 19.5 | 14 | 208.3 | 25–67 |
| 4 | 19.5 | 15 | 223.2 | 25–59 |
| 5 | 19.5 | 16 | 238.1 | 25–52 |
| 6 | 19.5 | 17 | 253.0 | 25–39 |
| 7 | 19.5 | 18 | 267.9 | 25–25 |
| 8 | 20.5 | 13 | 183.3 | 33–77 |
| 9 | 20.5 | 14 | 197.4 | 27–70 |
| 10 | 20.5 | 15 | 211.5 | 25–63 |
| 11 | 20.5 | 16 | 225.6 | 25–54 |
| 12 | 20.5 | 15 | 239.7 | 25–39 |
| 13 | 20.5 | 17 | 253.8 | 25–25 |
| 14 | 21.5 | 18 | 174.1 | 35–79 |
| 15 | 21.5 | 13 | 187.5 | 30–73 |
| 16 | 21.5 | 14 | 200.9 | 25–66 |
| 17 | 21.5 | 16 | 214.3 | 25–54 |
| 18 | 21.5 | 17 | 227.7 | 25–39 |
| 19 | 21.5 | 18 | 241.1 | 25–25 |
| 20 | 22.5 | 14 | 178.5 | 32–75 |
| 21 | 22.5 | 15 | 191.5 | 28–68 |
| 22 | 22.5 | 16 | 204.0 | 25–54 |
| 23 | 22.5 | 17 | 216.8 | 25–39 |
| 24 | 22.5 | 18 | 229.5 | 25–25 |
| 25 | 23.5 | 14 | 170.3 | 34–77 |
| 26 | 23.5 | 15 | 182.4 | 30–71 |
| 27 | 23.5 | 16 | 194.6 | 26–54 |
| 28 | 23.5 | 17 | 206.8 | 25–39 |
| 29 | 23.5 | 18 | 218.9 | 25–25 |
| 30 | 24.5 | 15 | 174.3 | 32–71 |
| 31 | 24.5 | 16 | 186.0 | 28–55 |
| 32 | 24.5 | 17 | 197.6 | 25–39 |
| 33 | 24.5 | 18 | 209.2 | 25–25 |
| 34 | 25.5 | 16 | 178.0 | 30–55 |
| 35 | 25.5 | 17 | 189.1 | 26–40 |
| 36 | 25.5 | 18 | 200.2 | 25–25 |

Table 5 and these more stringent performance requirements. This regression analysis yields the coupling efficiency ranges shown in Table 6 and the polymer data points shown in Table. 7.

TABLE 5

| Sample | C.E. | Polymer Performance REQUIREMENTS: MV1 (Poise) 6M–15M | MV2 (Poise) <6000 | PEEL (pli) >6.8 | HPST (min) >500 | STMY (°C.) 70 | REQ. MET |
|---|---|---|---|---|---|---|---|
| A | 10 | 3717x | 3490 | 5.5x | 18x | 60x | No |
| A | 30 | 6526 | 8930 | 8.2 | 3891 | 78 | Yes |
| A | 50 | 11460 | 22860x | 10.0 | 7000+ | 86 | No |
| B | 10 | 3804x | 840 | 5.8x | 15x | 65x | No |
| B | 30 | 6397 | 2160 | 8.1 | 1257 | 82 | Yes |
| B | 50 | 10760 | 5530 | 10.1 | 7000+ | 88 | Yes |
| C | 10 | 3283x | 5990 | 5.6x | 42x | 68 | No |
| C | 30 | 5870x | 15330x | 7.7 | 7000+ | 84 | No |
| C | 50 | 10496 | 39240x | 8.8 | 7000+ | 89 | No |
| D | 10 | 2770x | 1310 | 5.4x | 30x | 60x | No |
| D | 30 | 4722x | 3360 | 7.6 | 4634 | 77 | No |
| D | 50 | 8051 | 8590 | 8.8 | 7000+ | 84 | Yes |
| E | 10 | 3461x | 1680 | 5.6x | 22x | 63x | No |
| E | 30 | 5942x | 4300 | 8.2 | 2718 | 82 | No |
| E | 50 | 10199 | 11000x | 8.5 | 5696 | 86 | No |
| F | 10 | 3231x | 4760 | — | — | — | No |
| F | 30 | 5712x | 10890x | — | — | — | No |
| G | 35 | 6801 | 5440 | 8.8 | 5905 | 84 | Yes |

M: thousands
x denotes failure to meet requirements
MV1: Neat polymer viscosity at 350° F.
MV2: Adhesive viscosity at 350° F.
HPST: Holding Power to Steel
STMY: SAFT to MYLAR
PEEL: 180° peel adhesion

TABLE 6

| Preferred Sample | Summary of Preferred Polymer Parameter Limits: Melt Viscosity MV1 (Poise) 6–15M | MV2 (Poise) <6000 | Adhesive Requirements Mw > 170M CE >/= 25 PS > 12M Preferred CE Range |
|---|---|---|---|
| A | 28 </= CE </= 59 | CE < 22 | None |
| B | 28 </= CE </= 62 | CE < 51 | 33 </= CE < 51 |
| C | 31 </= CE </= 62 | CE < 10 | None |
| D | 39 </= CE </= 73 | CE < 42 | 39 </= CE < 42 |
| E | 31 </= CE </= 64 | CE < 37 | 31 </= CE < 37 |
| F | 31 </= CE </= 63 | CE < 17 | None |

TABLE 7

| | PSC (wt. %) | PS Block Mw (M) | Mol. Wt. (Ms) | C.E. Range (%) Preferred |
|---|---|---|---|---|
| 1 | 19.5 | 12 | 178.6 | 43–82 |
| 2 | 19.5 | 13 | 193.5 | 37–74 |
| 3 | 19.5 | 14 | 208.3 | 31–62 |
| 4 | 19.5 | 15 | 223.2 | 25–45 |
| 5 | 19.5 | 16 | 238.1 | 25–28 |
| 6 | 19.5 | 17 | 253.0 | None |
| 7 | 19.5 | 18 | 267.9 | None |
| 8 | 20.5 | 13 | 183.3 | 40–77 |
| 9 | 20.5 | 14 | 197.4 | 34–62 |
| 10 | 20.5 | 15 | 211.5 | 29–45 |
| 11 | 20.5 | 16 | 225.6 | 25–28 |
| 12 | 20.5 | 17 | 239.7 | None |

TABLE 7-continued

| | PSC (wt. %) | PS Block Mw (M) | Mol. Wt. (Ms) | C.E. Range (%) Preferred |
|---|---|---|---|---|
| 13 | 20.5 | 18 | 253.8 | None |
| 14 | 21.5 | 13 | 174.1 | 43–79 |
| 15 | 21.5 | 14 | 187.5 | 37–62 |
| 16 | 21.5 | 15 | 200.9 | 32–45 |
| 17 | 21.5 | 16 | 214.3 | 27–29 |
| 18 | 21.5 | 17 | 227.7 | None |
| 19 | 21.5 | 18 | 241.1 | None |
| 20 | 22.5 | 14 | 178.5 | 40–62 |
| 21 | 22.5 | 15 | 191.5 | 35–45 |
| 22 | 22.5 | 16 | 204.0 | None |
| 23 | 22.5 | 17 | 216.8 | None |
| 24 | 22.5 | 16 | 229.5 | None |
| 25 | 23.5 | 14 | 170.3 | 42–62 |
| 26 | 23.5 | 15 | 182.4 | 37–45 |
| 27 | 23.5 | 16 | 194.6 | None |
| 28 | 23.5 | 17 | 206.8 | None |
| 29 | 23.5 | 18 | 218.9 | None |
| 30 | 24.5 | 15 | 174.3 | 39–45 |
| 31 | 24.5 | 16 | 186.0 | None |
| 32 | 24.5 | 17 | 197.6 | None |
| 33 | 24.5 | 18 | 209.2 | None |
| 34 | 25.5 | 16 | 178.0 | None |
| 35 | 25.5 | 17 | 189.1 | None |

TABLE 7-continued

| | PSC (wt. %) | PS Block Mw (M) | Mol. Wt. (Ms) | C.E. Range (%) Preferred |
|---|---|---|---|---|
| 36 | 25.5 | 18 | 200.2 | None |

We claim:

1. A linear styrene-isoprene-styrene block copolymer composition comprised of linear polymeric blocks, said block polymer composition characterized in that it has a coupling efficiency from 25 to 82%, a polystyrene content of from 19 to 17% by weight, a polystyrene block molecular weight of from 12,000 to 18,000 and an overall molecular weight of from 170,000 to 280,000, both molecular weights being peak polystyrene equivalent molecular weights as determined by gel permeation chromatography.

2. A hot melt adhesive comprising the block copolymer composition of claim 1 and a tackifying resin.

3. The block copolymer composition of claim 1 wherein the polystyrene content ranges from 19 to 26% by weight, the polystyrene block molecular weight ranges from 12,000 to 17,000 and the overall molecular weight ranges from 170,000 to 240,000, both molecular weights being peak polystyrene equivalent molecular weights as determined by gel permeation chromatography.

4. A hot melt adhesive comprising the block copolymer composition of claim 3 and a tackifying resin.

* * * * *